(12) United States Patent
Kokal et al.

(10) Patent No.: US 9,009,272 B2
(45) Date of Patent: *Apr. 14, 2015

(54) INTERMEDIATE CONTENT PROCESSING FOR CONTENT DELIVERY NETWORKS

(71) Applicant: Limelight Networks, Inc., Tempe, AZ (US)

(72) Inventors: Mohan I. Kokal, Peoria, AZ (US); Bradley B. Harvell, Chandler, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/106,553

(22) Filed: Dec. 13, 2013

(65) Prior Publication Data

US 2014/0201320 A1    Jul. 17, 2014

Related U.S. Application Data

(63) Continuation of application No. 13/687,724, filed on Nov. 28, 2012, now Pat. No. 8,626,876.

(51) Int. Cl.
*G06F 15/16* (2006.01)
*H04L 29/08* (2006.01)
(Continued)

(52) U.S. Cl.
CPC ............ *H04L 67/06* (2013.01); *H04N 21/2181* (2013.01); *H04N 21/2183* (2013.01)

(58) Field of Classification Search
USPC .................. 709/203, 217, 219, 223, 246, 249
See application file for complete search history.

(56) References Cited

U.S. PATENT DOCUMENTS

| 7,240,100 B1 | 7/2007 | Wein et al. |
| 8,194,538 B2 | 6/2012 | Bornstein et al. |
| 8,219,645 B2 | 7/2012 | Harvell et al. |

(Continued)

FOREIGN PATENT DOCUMENTS

EP    1493094 B1    7/2011

OTHER PUBLICATIONS

"Architectural Design of Content Delivery Networks {CONs) for Media Distribution". Retrieved on Jan. 17, 2013 from http://essaybank.degree-essays.com/computer-science/architectural-design-of-content-delivery-networks-cdns-for-media-distribution.php, Degree Essays.

(Continued)

*Primary Examiner* — Oanh Duong
(74) *Attorney, Agent, or Firm* — Kilpatrick Townsend & Stockton, LLP

(57) ABSTRACT

A method for handling content requests received in a CDN using an intermediate server may include maintaining a virtual file server that provides virtualized access to content in multiple POPs throughout the CDN, receiving a content request sent to the CDN, making a local request to the virtual file server for the content, where the specialized virtual file server may determine that the content is stored in a second POP that is remotely located from the first POP, and the specialized virtual file server may retrieve the content from the second POP and provide the content to the intermediate server as though it were stored locally in the first POP. The method may also include receiving the content from the specialized virtual file server, where the specialized virtual file server makes the requested content appear to be a locally-stored file to an operating system of the intermediate server.

20 Claims, 10 Drawing Sheets

(51) Int. Cl.
*H04N 21/218* (2011.01)
*H04N 21/2183* (2011.01)

(56) References Cited

U.S. PATENT DOCUMENTS

| | | | |
|---|---|---|---|
| 8,255,557 | B2 | 8/2012 | Raciborski et al. |
| 8,626,876 | B1 * | 1/2014 | Kokal et al. ............... 709/219 |
| 2007/0153782 | A1 | 7/2007 | Fletcher et al. |
| 2008/0228920 | A1 * | 9/2008 | Souders et al. ............... 709/226 |
| 2009/0031128 | A1 | 1/2009 | French et al. |
| 2011/0055312 | A1 | 3/2011 | Purdy |
| 2011/0173345 | A1 | 7/2011 | Knox et al. |
| 2011/0213971 | A1 | 9/2011 | Gurel et al. |
| 2012/0041970 | A1 * | 2/2012 | Ghosh et al. ............... 707/769 |
| 2012/0096546 | A1 | 4/2012 | Dilley et al. |
| 2012/0198043 | A1 | 8/2012 | Hesketh et al. |
| 2012/0209942 | A1 | 8/2012 | Zehavi et al. |
| 2012/0215779 | A1 * | 8/2012 | Lipstone ............... 707/737 |
| 2012/0246273 | A1 | 9/2012 | Bornstein et al. |
| 2012/0275597 | A1 | 11/2012 | Knox et al. |
| 2013/0018978 | A1 | 1/2013 | Crowe et al. |

OTHER PUBLICATIONS

Fen Zhou et al., "Minimizing Server Throughput for Low-Delay Live Streaming in Content Delivery Networks". Retrieved on Jan. 17, 2013 from https://portail.telecom-bretagne.eu/publilpublic/fic_download.jsp?id=7862, Jun. 7-8, 2012, 6 Pages, Toronto, Canada.

Suman Ramkumar Srinivasan et al., "ActiveCDN: Cloud Computing Meets Content Delivery Networks", Retrieved on Jan. 17, 2013 from http://academiccommons.columbia.edu/catalog/ac%3A 141937, 2011, 7 Pages, Department of Computer Science, Columbia University, New York.

* cited by examiner

INTERMEDIATE CONTENT PROCESSING FOR CONTENT DELIVERY NETWORKS

CROSS-REFERENCE TO RELATED APPLICATIONS

This application is a continuation of U.S. patent application Ser. No. 13/687,724 filed Nov. 28, 2012 and entitled "INTERMEDIATE CONTENT PROCESSING FOR CONTENT DELIVERY NETWORKS," the entire disclosure of which is hereby incorporated by reference for all purposes as if fully set forth herein.

BACKGROUND

This disclosure relates in general to a content delivery network (CDN) and, but not by way of limitation, to intermediate caching and processing to more efficiently utilize the CDN.

A CDN is a large distributed system of servers deployed in multiple data centers in the Internet. The goal of a CDN is to serve content to end-users with high availability and high performance. Besides better performance and availability, CDNs also offload the traffic served directly from the content provider's origin infrastructure. CDNs can include geographically distributed points of presence (POPs) to locate edge servers close to end users. CDNs are capable of delivering content in high demand with higher levels of quality of service (QoS). Content can be requested by universal resource locator (URL) from a CDN. Various techniques are used to route a URL request to a nearby POP, for example, in order to efficiently retrieve content.

Customers are using CDNs and cloud services in more creative ways. Applications, storage, and other services are being provided remotely. New forms and formats for content delivery are constantly being provided that can possibly provide greater access to content, faster transfer rates, and less burden on origin servers.

SUMMARY

In one embodiment, the present disclosure provides a description of an intermediate server for handling content requests received from edge servers in a Content Delivery Network (CDN) and accessing and processing content distributed throughout the CDN. The intermediate server may include a port that receives a content request from an edge server. The content request may include a Uniform Resource Identifier (URI) associated with requested content, and the edge server and the intermediate server may be part of a first Point-of-Presence (POP) in the CDN. The intermediate server may also include a content processor communicatively coupled to the port and configured to pass the URI to an operating system operating on the intermediate server, receive the requested content from the operating system, and perform a processing function on the requested content to produce processed content for delivery to the edge server. The intermediate server may additionally include a CDN content interface that provides virtualized access to content files accessible using URIs throughout the CDN. The CDN content interface may be configured to receive a first portion of content using the URI where the first portion of content may be stored in the first POP, receive a second portion of content using the URI where the second portion of content may be accessible from a second POP, and provide the requested content to the content processor. The requested content may include the first portion of content and the second portion of content.

In some embodiments, the CDN content interface may include a virtual file server that operates in userspace without requiring modifications to a kernel of the operating system, a physical storage device, and a caching engine that communicates with the local storage device and other devices in the CDN. The caching engine may be configured to store the first portion of content and second portion of content in the physical storage device. The CDN content interface may be further configured to receive a third portion of the requested content using the URI, where the third portion of the requested content may be stored in the physical storage device, and the requested content may further include the third portion of the requested content. The physical storage device may have a storage capacity that is less than a storage capacity of edge server.

In some embodiments, the processing function may include dividing the requested content in streaming data chunks. The content processor may include a File Transfer Protocol (FTP) server. The processing function may transcoding the requested content from a first file format to a second file format. The processing function may include encrypting or decrypting the requested content. The content processor may include a third-party module requiring a per-installation license. The second portion of content may be retrieved from an origin server that is accessible through the second POP. The intermediate server may be configured to determine that only a portion of the processed content should be delivered to the edge server, and the processed content may be based on only a portion of the requested content.

In another embodiment, A method of handling content requests received from edge servers by an intermediate server in a CDN and accessing and processing content distributed throughout the CDN. The method may include receiving a content request through a port from an edge server. The content request may include a Uniform Resource Identifier (URI) associated with requested content, and the edge server and the intermediate server may be part of a first Point-of-Presence (POP) in the CDN. The method may also include passing the URI to an operating system operating on the intermediate server and passing the URI from the operating system to a CDN content interface that provides virtualized access to content files accessible using URIs throughout the CDN. The method may additionally include receiving, by the CDN content interface a first portion of content using the URI where the first portion of content may be stored in the first POP, and a second portion of content using the URI where the second portion of content may be accessible from a second POP. The method may further include passing the requested content to the content processor. The requested content may include the first portion of content and the second portion of content. The method may also include performing a processing function on the requested content by the content processor to produce processed content for delivery to the edge server.

According to yet another embodiment, another intermediate server for handling content requests received from edge servers in a Content Delivery Network (CDN) and accessing and processing content distributed throughout the CDN may be discussed. The intermediate server may include a port that receives a content request from an edge server. The content request may include a Uniform Resource Identifier (URI) associated with requested content, and the edge server and the intermediate server may be part of a first Point-of-Presence (POP) in the CDN. The intermediate server may also include a content processor communicatively coupled to the port and configured to perform a processing function on the requested content to produce processed content for delivery to the edge server, where the processing function comprises dividing the requested content in streaming data chunks. The intermediate server may additionally include a CDN content interface that provides virtualized access to content files accessible using URIs throughout the CDN. The CDN content interface may be configured to receive a first portion of content using the URI where the first portion of content may be accessible from a second POP, and provide the requested content to the content processor where the requested content may include the first portion of content.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
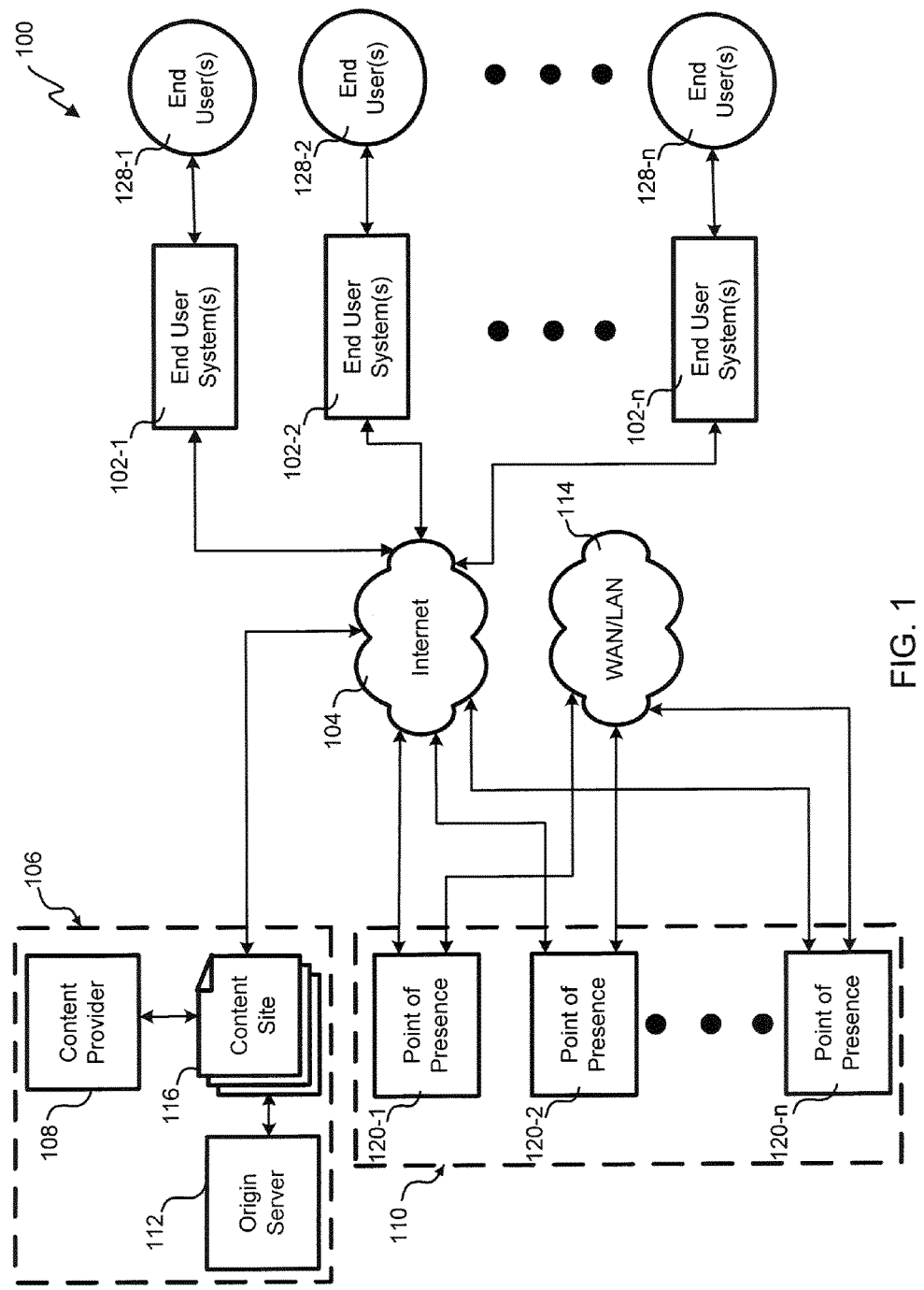
FIG. 1 depicts a block diagram of an embodiment of a content distribution system.

Referring first to FIG. 1, a block diagram of an embodiment of a content distribution system 100 is shown. The content originator 106 offloads delivery of the content objects to a content delivery network (CDN) 110 in this embodiment. The content originator 106 produces and/or distributes content objects and includes a content provider 108, a content site 116, and an origin server 112. The CDN 110 can both cache and/or host content in various embodiments for third parties to offload delivery and typically provide better quality of service (QoS) to a broad spectrum of end-user systems 102 distributed worldwide.

In this embodiment, the content distribution system 100 locates the content objects (or portions thereof) and distributes the content objects to an end-user system 102. The content objects can be dynamically cached and/or hosted within the CDN 110. A content object may include any content file or content stream and could include, for example, video, pictures, data, audio, software, analytics, and/or text. The content object could be live, delayed, or stored. Throughout the specification, references may be made to a content object, content, content stream and/or content file, but it is to be understood that those terms could be used interchangeably wherever they may appear.

Many content providers 108 may use a CDN 110 or even multiple CDNs 110 to deliver the content objects over the Internet 104 to end users 128. The CDN 110 may include a number of points of presence (POPs) 120, which are geographically distributed through the content distribution system 100 to deliver content. Various embodiments may have any number of POPs 120 within the CDN 110 that are generally distributed in various locations around the Internet 104 so as to be proximate to end-user systems 102 in a network sense. Routing requests between the multiple POPs can be done during the DNS resolution and refined by assignment of the edge server after request for the content in this embodiment. Other embodiments use routing, redirection, Anycast, DNS assignment and/or other techniques to locate the particular edge server that will provide content to an end user 128. In addition to the Internet 104, a wide area network (WAN) and/or local area network (LAN) 114 or other backbone may couple the POPs 120 with each other and also couple the POPs 120 with other parts of the CDN 110.

When an end user 128 requests a web page through its respective end-user system 102 while browsing, the request for the web page is passed either directly or indirectly via the Internet 104 to the content originator 106. The content originator 106 is the source or re-distributor of content objects. The content site 116 may include an Internet web site accessible by the end-user system 102. In one embodiment, the content site 116 could be a web site where the content is viewable using a web browser. In other embodiments, the content site 116 could be accessible with application software or customized hardware other than a web browser, for example, a set top box, a content player, video streaming appliance, a podcast player, etc. The content provider 108 directs content requests to a CDN 110 after they are made or formulates the delivery path by embedding the delivery path into the universal resource indicators (URIs) for a web page. In either case, the request for content can be handed over to the CDN 110 in this embodiment by having the end-user system 102 perform a DNS look-up to choose where to request content from two or more POPs 120.

A particular edge server may retrieve the portion of the content object from the content provider 108. Alternatively, the content provider 108 may directly provide the content object to the CDN 110 and its associated POPs 120 through prepopulation, i.e., in advance of the first request. The CDN servers include edge servers in each POP 120 that actually serve end user requests. The origin server 112 holds a copy of each content object for the content originator 106. Periodically, the content of the origin server 112 may be reconciled with the CDN 110 through a cache, hosting and/or pre-population algorithm. Some content providers could use an origin server within the CDN 110 to host the content and avoid the need to maintain a copy.

Once the content object is retrieved from the origin server 112, the content object is stored within the particular POP 120 and is served from that POP 120 to the end-user system 102. The end-user system 102 receives the content object and processes it for use by the end user 128. The end-user system 102 could be a personal computer, media player, tablet computer, handheld computer, Internet appliance, phone, IPTV set top, video stream player, streaming radio or any other device that receives and plays content objects. In some embodiments, a number of the end-user systems 102 could be networked together. Although this embodiment only shows a single content originator 106 and a single CDN 110, it is to be understood that there could be many of each in various embodiments. Additionally, some embodiments could have multiple CDNs 110, where a content originator 106 could have a captive CDN 110 optionally used for its content or not when a third-party CDN is used to shed requests.

Figure 2:
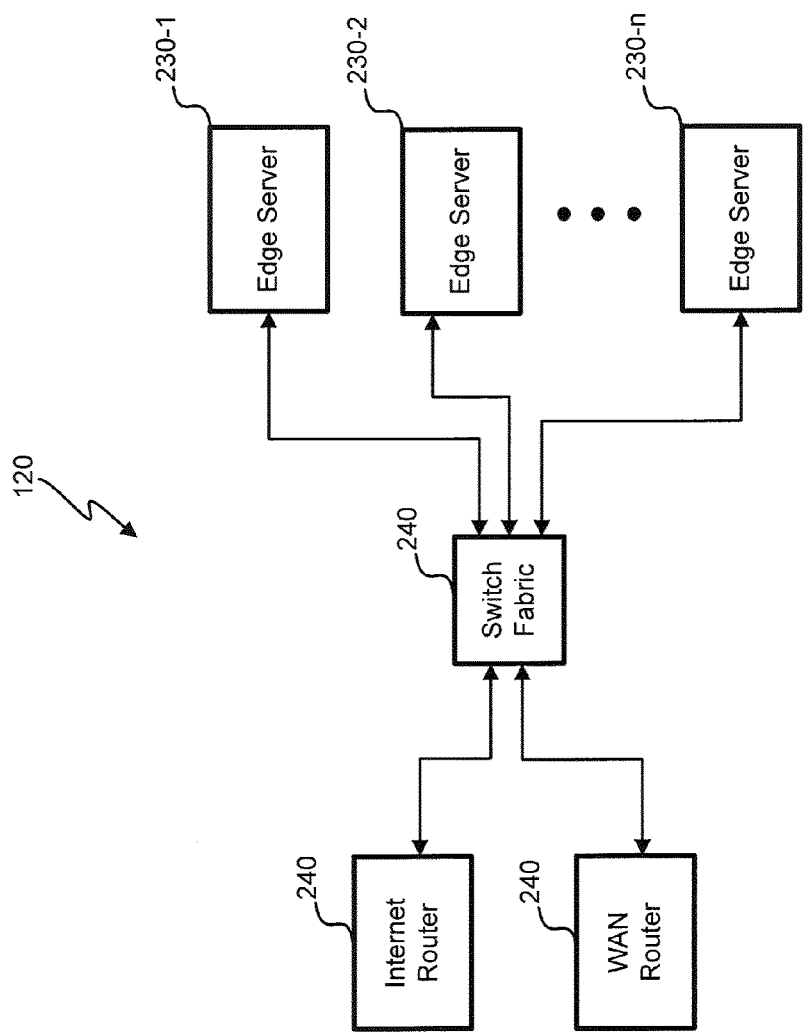
FIG. 2 depicts a block diagram of an embodiment of a point of presence (POP) that is part of a content delivery network (CDN).

With reference to FIG. 2, a block diagram of an embodiment of a POP 120 is shown that is part of a CDN 110. Although only one POP 120 is depicted, there are a number of POPs 120 similarly configured and geographically distributed throughout the CDN 110. The POPs 120 communicate through a WAN router 210 and/or an Internet router 220 when locating content objects. An interface to the Internet 104 from the POP 120 accepts requests for content objects from end-user systems 102. The request comes from an Internet protocol (IP) address in the form of a URI.

Edge servers 230 are made with general purpose computers loaded with software to perform various functions for the CDN 110. The edge servers 230 could be rack mounted or arranged in clusters. Multiple hardware processors and storage media could be used to implement each edge server 230. Each edge server 230 can load multiple instances of the same software and/or a variety of software to implement various functionality. For example, software may be used on edge servers to implement switching fabric, routing, caching, hosting, DNS lookup, analytics, business rules, delivery assignment, etc. The software instances can scale with loading of the POP 120. Different edge servers 230 may have a different set of functionality as defined by the software instances that are programmed to run on each edge server 230.

Switch fabric 240 assigns the request to one of the edge servers 230 according to a routing scheme such as round robin, load balancing, CARP, random, etc. In this embodiment, the switch fabric is aware of which edge servers 230 have what capabilities and assigns within the group having the capability to store and serve the particular content object referenced in the URI. A protocol such as CARP is used in this embodiment to disperse the URIs between the group of edge servers 230. Every time that a particular URI is requested from the group, it is assigned to the same edge server 230 using CARP. The caches gathered in a particular group as neighbors can be the other servers in the current POP, less loaded servers in the current POP, servers having the capability to process the content object, a subset of servers assigned to a customer using the CDN to serve the content object, or some other grouping of servers in the POP 120.

In another embodiment, the switch fabric 240 assigns the request to one of the edge servers 230, which performs CARP to either service the request or reassign it to a neighboring edge server 230 with software to perform an assignment master function. The switch fabric 240 sends each packet flow or request to an edge server 230 listed in the configuration of the switch fabric 240. The assignment can be performed by choosing the edge server 230 with the least amount of connections or the fastest response time, but the switch fabric 240 in this embodiment assigns the packet flow somewhat arbitrarily using round robin or random methodologies. When the chosen edge server 230 receives the packet flow, an algorithm like CARP is used by the chosen edge server 230 to potentially reassign the packet flow between a group of edge servers to the one dictated by the algorithm. For example, the switch fabric 240 could choose a second edge server 230-2 being the next in the round robin rotation. The second edge server 230-2 would perform CARP on the request and find that the first edge server 230-1 is being assigned this type of request. The request would be reassigned to the first edge server 230-1 to fulfill.

In some cases, the CDN 110 is used to host content for others. Content providers 108 upload content to an edge server 230 who hosts the content to function as an origin server. After the content provider 108 places a content object in the CDN 110 it need not be hosted on the origin server 112 redundantly. Edge servers 230 can perform the hosting function within the CDN 110 with other edge servers 230 perhaps caching the same content that is hosted by another edge server 230.

Requests from end-user systems 102 are assigned to an edge server 230 that may cache the requested content object. On occasion, the edge server 230 receiving a request does not have the content object stored and available for immediate serving. This so-called "cache miss" triggers a process within the CDN 110 to effectively find the content object (or portion thereof) while providing adequate QoS. The content may be found in neighboring edge servers 230 in the same POP 120, in another POP 120 or even an external origin server 112. The various edge servers 230 are grouped for various URIs uniquely. In other words, one URI may look to one group of edge servers 230 on a cache miss while another URI will look to a different group of edge servers 230. In various embodiments, a particular URI could be assigned to one or more edge servers 230 in a single POP 120, multiple POPs 120 or even in every POP 120. Generally, more popular content is stored on more edge servers 230 and more POPs 120.

When servicing requests from end-user systems 102, some form of content processing may be performed on the requested content before it is delivered from an edge server 230. In some cases, content processing may be performed by special software/hardware modules that are integrated with existing devices within the POP 120 or on the origin server itself 112. If the content processing is performed on an edge server 230 or on an origin server 112, the software/hardware performing the content processing may need to be distributed to each edge server 230 and/or each origin server 112.

As modern CDNs proliferate and become more complex, content processing may become more specialized and programming intensive. In some embodiments, content processing may be performed by a module supplied by a third-party. Third-party modules are often subject to licensing agreements and per-installation fees. In this situation, it may be impractical to install content processors on each edge server 230. It may be even more impractical to expect content providers 108 to accept licensing agreements and pay the associated fees in order to install content processors on each origin server 112. Furthermore, content processors may evolve on a constant basis as new streaming, encryption, and transmission technologies are explored. This can result in frequent upgrades, patches, and reinstallations for content processors. A CDN may include thousands of edge servers 230 and hundreds of POPs 120. Keeping each of the edge servers 230 up to date with current versions of a third-party content processor could increase the overhead costs to a CDN. The CDN would also have to enforce version control and security updates for third-party content processors installed on origin servers 112 that are serviced by the CDN.

Figure 3:
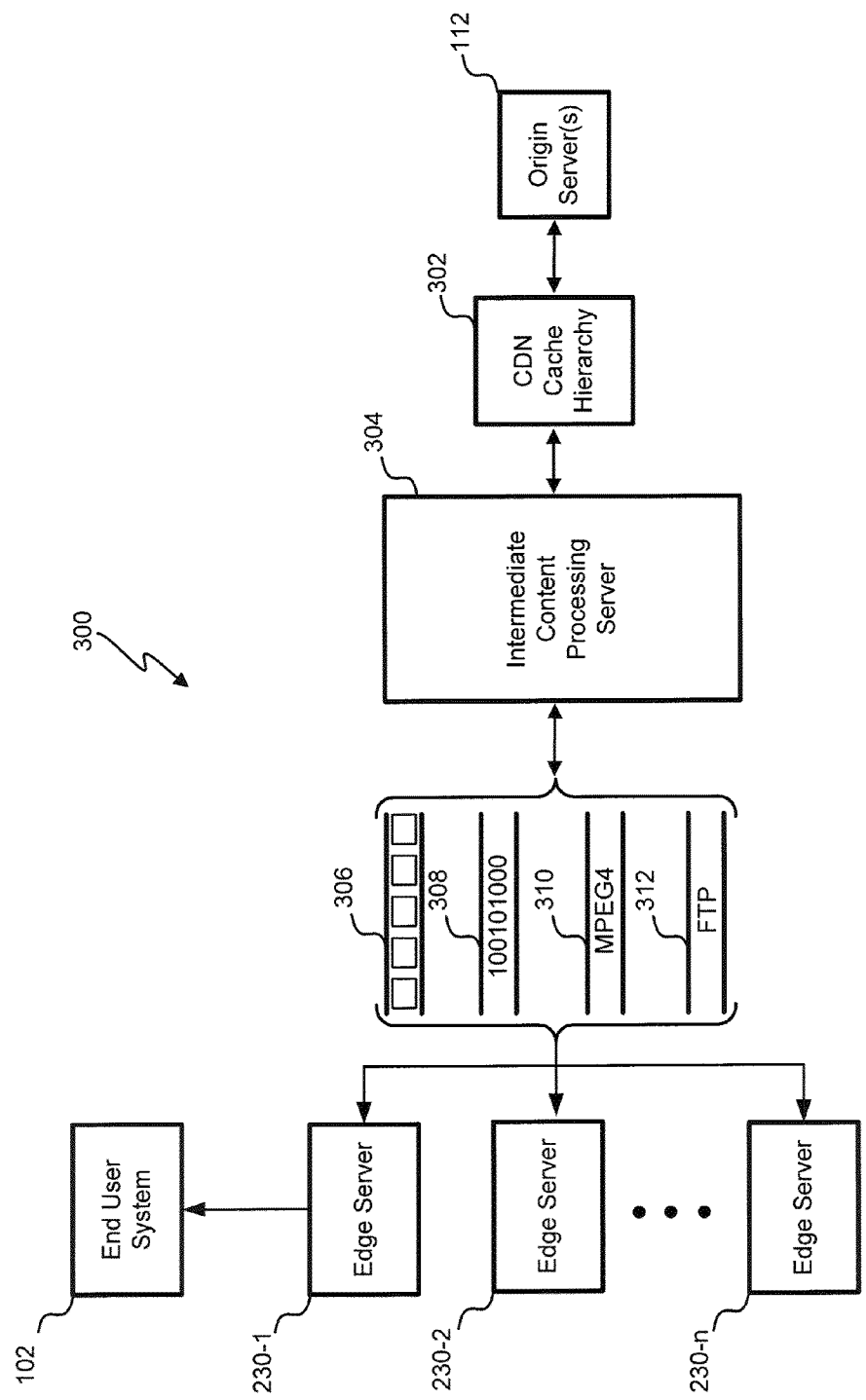
FIG. 3 depicts a block diagram of an Intermediate Content Processing Server (ICPS) that is part of a CDN.

Embodiments described herein may disclose an intermediate content processing server (ICPS) that can be used to process and deliver content to edge servers 230. FIG. 3 depicts a block diagram 300 of an ICPS that is part of a CDN. Edge servers 230 may receive requests from end-user systems 102 for content provided by an origin server 112. As described above, the origin server 112 can provide cached versions of content, or portions of content, to a CDN cache hierarchy 302. The CDN cache hierarchy can store local copies of content in POPs throughout the CDN such that a local copy of the content is available when a nearby edge server 230 receives a request from an end-user system 102. If the CDN cache hierarchy 302 does not have a cached copy of the content, then the content may be retrieved from the origin server 112.

If content processing is to be used for a content request, the CDN cache hierarchy 302 or the origin server 112 may first provide the content to an ICPS 304 within the CDN. The ICPS 304 can retrieve the content, or a portion of the content, and use a local content processor to process the content, or a portion of the content retrieved. The processed content can then be sent to an edge server 230 for delivery to an end-user system 102. The CDN cache hierarchy 302 may include edge servers and ICPSs from a plurality of different POPs. Therefore, within the ICPS 304, a specialized CDN content interface may be configured to provide virtualized access to both local and remote content accessible by the various POPs of the CDN. The CDN content interface will be described in greater detail later in this disclosure.

As used herein, the term "content processing" may be used to refer to any type of processing that changes the format, substance, and/or encoding of content. As illustrated in FIG. 3, different content processors may have different effects on a content stream. In one embodiment, the content processor may "chunk" a content file into pieces that can be streamed or broadcast to an end-user system 102. For example, a content processor may divide a video file into chunks, where each chunk comprises a valid video file with a header, video track, and/or audio track. Each chunk can contain at least one keyframe such that individual chunks can be played back by themselves. Chunked content 306 may then be delivered, possibly piecewise, to one or more edge servers 230. The edge servers can then provide the chunk streaming to individual end-user systems 102.

In another embodiment, the content processing may include encrypting a content file. Alternatively, the content processing may include decrypting a content file that was previously stored on an origin server 112 in an encrypted form. In another embodiment, content processing may include changing an encryption type of the content file to be compatible with a web browser or content playback application operating on an end-user system 102. An encrypted/decrypted stream 308 may be delivered from the ICPS to one or more edge servers 230 for delivery to end-user systems 102.

In another embodiment, the content processing may include transcoding content formats. Generally, transcoding may include the direct digital-to-digital data conversion of one encoding to another encoding. This may be used in cases where an end-user system 102 does not support a particular content format, or were limited storage capacity mandates a reduced file size. Therefore, transcoding may also include data compression/decompression. Content processing that includes transcoding may include first decoding the content to an intermediate uncompressed format, and then transcoding the content into a target format. In one embodiment, transcoding-type data processing can be used to compress and/or change the format of content files stored on an origin server 112 into a format that is compatible with the edge servers 230 in the CDN. In another embodiment, transcoding-type data processing can be used to provide content to end-user systems 102 that use a variety of different operating systems, playback modules, and/or content applications. In these cases, transcoded content 310 may be provided to the edge servers 230 for storage/delivery.

In yet another embodiment, the content processing may include operations typical of a File Transfer Protocol (FTP) server. FTP servers may include control and data connections between the end-user system 102 and/or the ICPS 304. FTP transactions may also include authentication, including a username and password to authorize access to content, or alternatively may allow for anonymous connections. In this case, an FTP communication channel 312 may be opened between an end-user system 102 and the ICPS 304 that may or may not involve one or more edge servers 230. The end-user system 102 may interact with the ICPS 304 as an FTP server, while the ICPS 304 retrieves files from a local cache, from the CDN cache hierarchy 302, or from an origin server 112. The FTP communication channel 312 may appear as though all of the content requested and transmitted is locally sourced by the ICPS 304. Therefore, the fact that the ICPS 304 may retrieve requested content from remote devices and/or locations may be transparent to the end-user system 102.

It will be understood that these four types of content processing described above are merely exemplary, and not meant to be limiting. Other types of content processing may also be provided by an ICPS 304 that are not listed here explicitly, such as natural language processing, demand processing, bit rate processing, data mining, adaptive searches on content, social media functions, interactions with other APIs, human language translation, content blocking, parental controls, content censoring, content rating, security controls, and/or the like.

In some embodiments, the ICPS 304 may contain a single content processor and may provide a single type of content processing, such as chunk streaming. In other embodiments, the ICPS 304 may include multiple content processors, where each content processor may provide one or more content processing functions. In another embodiment, the ICPS 304 may combine multiple content processing functions into a single content processor, which may then perform multiple content processing functions on requested content. For example, one or more content processors in a single ICPS 304 may decompress content from an origin server 112, decrypt the content, transcode the content into a different format, recompress the content, and provide the content through an FTP request to an end-user system 102 via an edge server 230. Other combinations and permutations of content processing functions may also be provided by different embodiments as would be understood in light of this disclosure.

In some embodiments, the ICPS 304 may be a lean, lightweight server in comparison to the edge servers 230. For example, an ICPS 304 may include a local storage medium that is small in comparison to a storage medium associated with an edge server 230. Thus, an ICPS 304 may provide access to a very large amount of memory storage without being required to manage the entirety of the memory storage locally, but can instead interact with other devices to expand the memory space accessible to the ICPS 304.

In one embodiment, the ICPS 304 may be organized in the same POP with multiple edge servers, such that a single ICPS 304 provides content processing for multiple edge servers 230. A single POP may also include a plurality of ICPSs 304. The ICPS 304 may be implemented using a server that is physically distinct from the edge servers 230. In another embodiment, the ICPS 304 may be physically integrated with one of the edge servers 230.

Figure 4A:
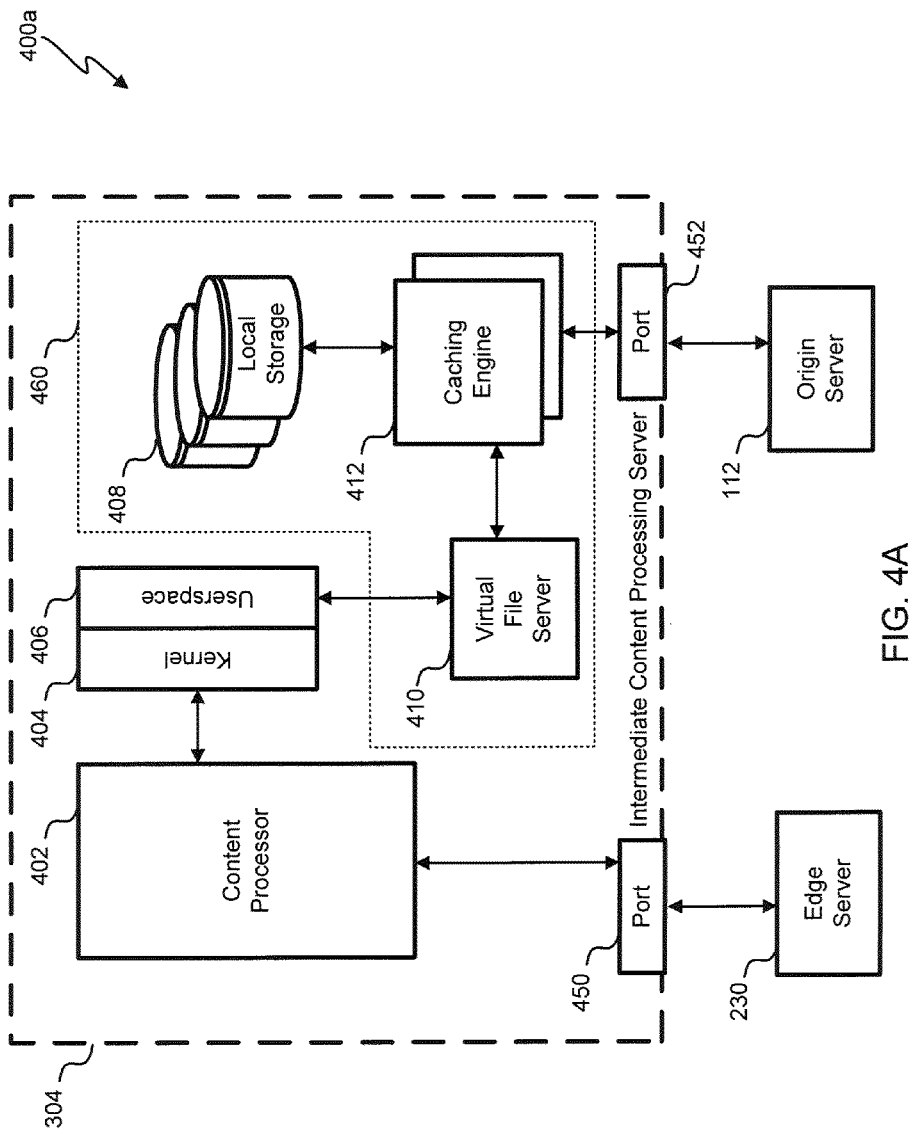
FIG. 4A depicts a block diagram of an ICPS, according to a first embodiment.

FIG. 4A depicts a block diagram 400a of an ICPS 304, according to a first embodiment. FIG. 4A may represent a physical server, or alternatively, it may represent a logical implementation of hardware and software on an existing edge server. Assuming a physically distinct server, the ICPS 304 may include a port 450 configured to receive content requests from one or more edge servers 230.

The port 450 may provide the request to a content processor 402. The request may be provided directly to the content processor 402, or may pass through additional software modules, such as a request handling module. In one embodiment, the content processor 402 may represent a third-party software module installed and operating on a processor on the ICPS 304. For example, the content processor 402 may include an Apache® HTTP server and/or an Adobe® proprietary streaming module or another type of streaming module configured to stream content in an HTTP Live Streaming (HLS) format, Microsoft® Smooth Streaming format, HTTP Dynamic Streaming (HDS) format, and/or the like. The content processor 402 may be configured to operate in a Just-in-Time (JIT) fashion. The content processor 402 may also comprise a plug-in configured to interact with other software modules operating on the ICPS 304.

In some embodiments, the content processor 402 may be thought of as a "black box" with a known interface. For example, a proprietary third-party software module may provide an API to interact with a local file system and/or port 450. This may allow different software modules to be swapped in and out or to be used interchangeably with common ICPS hardware and software. For example, a single ICPS hardware and software configuration may be designed to work with a number of different content processors 402. A single POP may include several identical or nearly identical ICPSs 304, each including a different type of content processor 402, and each providing a different type of content processing.

In some embodiments, and with some types of third-party software modules, the content processor 402 may be configured to interact with a local file system. Under normal operating circumstances outside of the ICPS 304, these third-party software modules may be expected to interact with a local disk storage. For example, many third-party software modules may be specifically designed to operate on an origin server 112, or alternatively on an edge server 230. Both of these devices may be assumed to have local file systems with a single logical address space.

In contrast, the ICPS 304 may include a local file system that is augmented with a virtual file system to expand the accessible content beyond any local storage available on the ICPS 304. In this particular embodiment, a local kernel 404 may operate as part of a local operating system that receives a request for a URI from the content processor 402. The local file system can determine that a file associated with the requested URI is available in the local file system, and then retrieve the requested content from the local file system. For example, the local operating system may interact with a system library, such as the GNU C Library (GLIBC) that provides system calls and other basic functions for interacting with a file system. Note that in some embodiments, the kernel 404 may simply pass the content request through to another module without checking any local kernel storage for the requested content.

If the operating system determines that the requested file is not located in its file system, or if the local kernel 404 is simply passing requests through, the local operating system can pass the content request to a CDN content interface 460. The CDN content interface 460 may be configured to provide virtualized access to content objects that are accessible via the CDN. These objects may be stored both locally and remotely, within the same POP or within different POPs, on edge servers and on origin servers. The CDN content interface 460 may also be configured to interface with portions of requested content, such that a requested content object may be broken up into smaller pieces and requested from separate locations. In some cases, the separate locations may be located in different POPs. Additionally, the CDN content interface 460 may be specifically designed to handle URIs that can include a filename and a resource path.

In one embodiment, the CDN content interface 460 may be comprised of a number of sub-modules and hardware devices. In the example of FIG. 4A, the CDN content interface 460 is comprised of a virtual file server 410, a caching engine 412, and a local storage device 408. It will be understood that these sub-modules and hardware devices are merely exemplary, and other embodiments may use different configurations to achieve virtualized access to the CDN from the ICPS 304.

In this embodiment, the virtual file server 410 may be implemented in part using a File System in User Space (FUSE). The FUSE may comprise a loadable kernel module that allows the ICPS 304 designer to create a virtual file server 410 without editing the local kernel 404. Generally, the virtual file server 410 need not actually store content itself. Instead, it can act as a view or translation of existing file systems or storage devices throughout the CDN. In the case of the particular ICPS 304, the virtual file server 410 may act as a view or translation of file systems or storage devices that are geographically or logically remote from the ICPS 304.

One effect of using a specialized virtual file server 410 that is configured to interface internally with a CDN is that it can make remote files appear local to the content processor 402. Therefore, instead of needing to install a content processor 402 on each server location where content is stored, fewer locations (ICPSs) can be used to process content from disparate sources, and transmit the processed content to edge servers.

The particular embodiment of FIG. 4A, the virtual file server 410 may interact with a caching engine 412. The caching engine 412 may be configured to cache objects that have been recently requested from other storage locations. The caching engine 412 may store a local cached copy of objects in a local storage device 408. The local storage device 408 may be implemented using disk arrays, hard disks, flash memory, and/or the like. The caching engine 412 may be configured to determine when each stored object was last used, how often objects are used, how likely objects are to be used in the future, an estimated time when an object will be next used, and/or the like. Generally, the caching engine 412 may be used to optimize the contents of the local storage device 408 such that any requested content can be efficiently delivered from the ICPS 304 instead of requiring content to be retrieved from a remote location. In one embodiment, the Edge Prism Caching Engine designed by Limelight Networks® may be used to implement the caching engine 412.

When the caching engine 412 determines that a local cached copy of the requested content is not available, the caching engine may request the content from a remote location through port 452. For example, the caching engine 412 may request a copy of the content from an origin server 112 from a content provider. In some embodiments, the caching engine 412 may simply submit a request for content to the CDN cache hierarchy such that additional edge servers in the CDN can respond if they store at least a portion of the requested content. The origin server 112 may respond by providing a copy of the content, or a portion of the content to the caching engine 412. If the caching engine 412 determines that storing a local copy of the content comprises an efficient use of the local storage device 408 (e.g. the content will be requested again in the near future) then a local cached copy may be retained. Alternatively, the caching engine 412 may simply provide the requested copy to the virtual file server 410 for content processing.

In either case, the requested content may be provided through the CDN content interface 460 to the local kernel 404, and then to the content processor 402. Again, in some embodiments, the content processor 402 may interact with the received content as though it were retrieved from a local file system. In other words, the operation of the CDN content interface 460 and/or the caching engine 412 may be transparent to the content processor 402. Finally, the content processor 402 may process the requested content and deliver it to the edge server 230 through port 450.

Figure 4B:
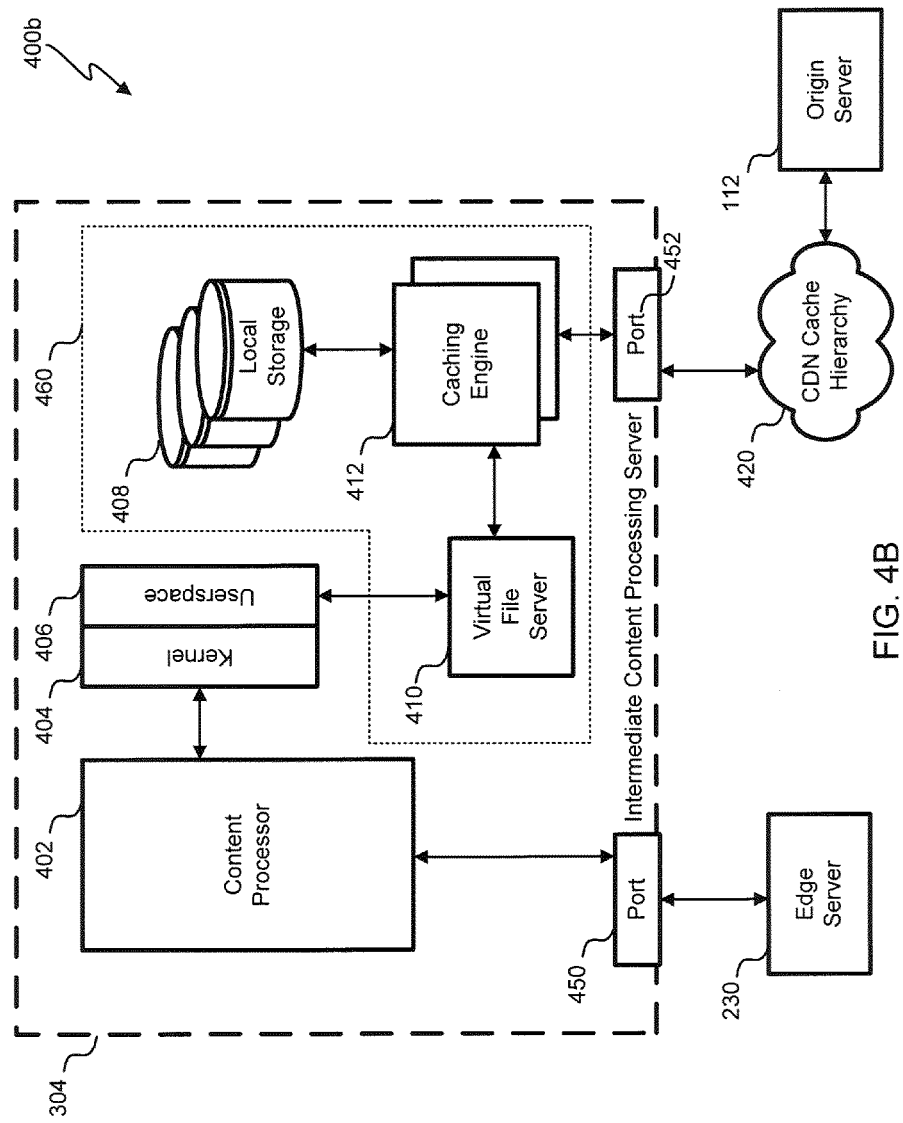
FIG. 4B depicts a block diagram of an ICPS, according to a second embodiment.

FIG. 4B depicts a block diagram 400b of an ICPS 304, according to a second embodiment. This embodiment is similar to the embodiment depicted by FIG. 4A. However, instead of interacting with an origin server 112, the caching engine 412 may interact through port 552 with another device in the CDN cache hierarchy 420. The CDN cache hierarchy 420 may be made up of numerous other edge servers 230, router devices, storage locations, and/or the like. The caching engine 412 may give priority to locations within the CDN cache hierarchy 420 that are closer physically, logically, or otherwise to the ICPS 304. The caching engine 412 may also give priority to connections with the lowest latency or with the most available bandwidth.

In one embodiment, the caching engine 412 may retrieve portions of the requested content from more than one location within the CDN cache hierarchy 420. In some cases, the caching engine 412 may connect to multiple locations within the CDN cache hierarchy 412 in a peer-to-peer (P2P) fashion in order to retrieve portions of the requested content from multiple locations.

In one embodiment, one location in the CDN cache hierarchy 420 may be quickly and readily accessible by the ICPS 304. In this case, because of what may be a limited capacity of the local storage device 408, the caching engine 412 may forgo caching a copy of the requested content in the local storage device 408. Instead, because of the logical or geographic proximity of the content location within the CDN cache hierarchy 420, the caching engine 412 may simply rely on the other external copy of the content. Additionally, the CDN cache hierarchy 420 may be comprised of multiple POPs that are geographically spread throughout a large area. Therefore, the CDN content interface 460 may retrieve content from multiple POPs. Each POP may also be in communication with multiple origin servers, such as origin server 112, and thus content, or portions of content, may be retrieved from one or more remote origin servers that are associated with a POP that is different from the ICPS's POP.

Figure 4C:
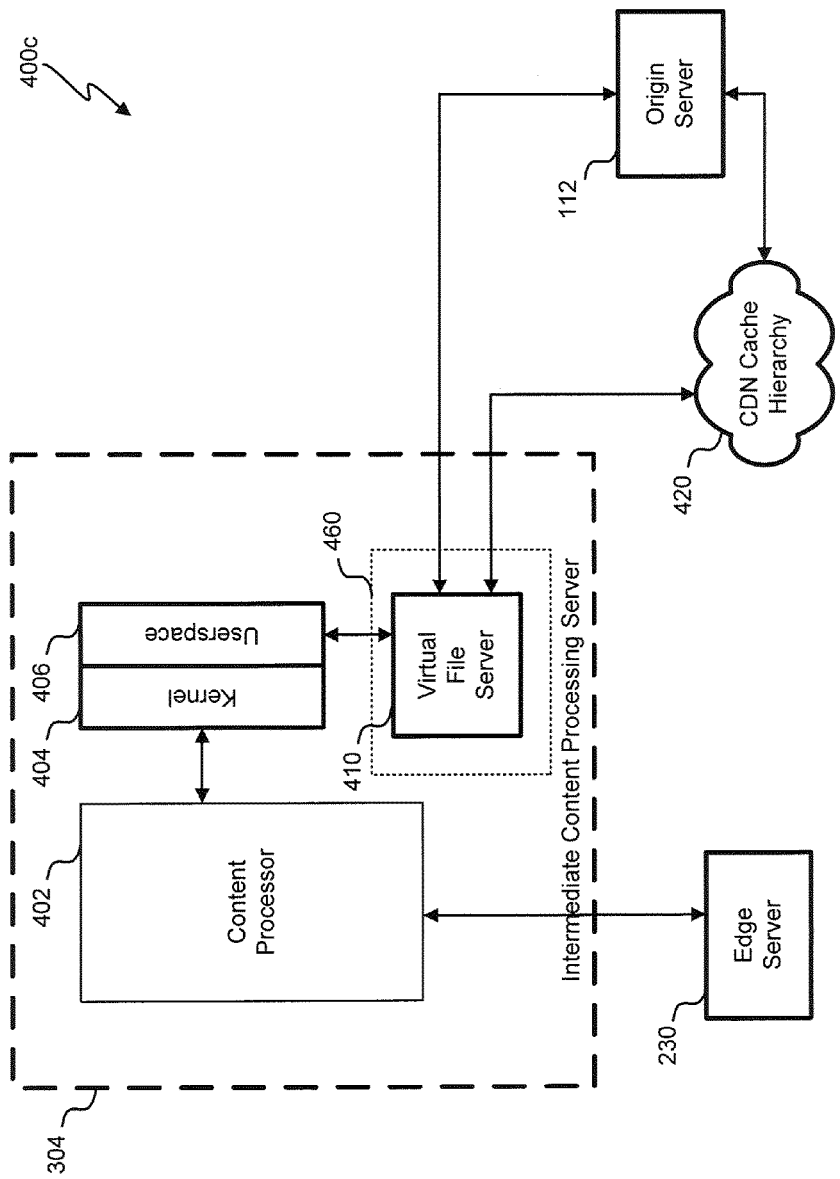
FIG. 4C depicts a block diagram of an ICPS, according to a third embodiment.

FIG. 4C depicts a block diagram 400c of an ICPS, according to a third embodiment. This embodiment is similar to the embodiments described in relation to FIG. 4A and FIG. 4B. However, in this case, the CDN content interface 460 may be designed without a local storage device 408 and/or without a caching engine 412. Instead, the CDN content interface 460 may rely entirely on external storage sites to supply content to the content processor 402. The virtual file server 410 may receive requests through the user space 406 associated with the local kernel 404, and send the request to an external location at which the requested content is currently stored.

The virtual file server 410 may retrieve the requested content from any storage device associated with the CDN. For example, the virtual file server 410 may retrieve the requested content from an origin server 112 associated with the content provider serviced by the CDN. The virtual file server 410 may also retrieve the requested content from a device associated with the CDN cache hierarchy 420. Either case may involve multiple POPs.

Designing the CDN content interface 460 without a local storage device 408 and/or without a caching engine 412 may result in a leaner, less expensive, less complicated server. To compensate for the lack of a local storage device 408, the cost/space/complexity savings may allow a CDN operator to deploy multiple ICPSs 304 in each POP. Alternatively, the ports and communication systems of the ICPS 304 can be optimized to increase the throughput of content from other locations.

In one embodiment, the various modules and systems in FIGS. 4A-4C may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Figure 5:
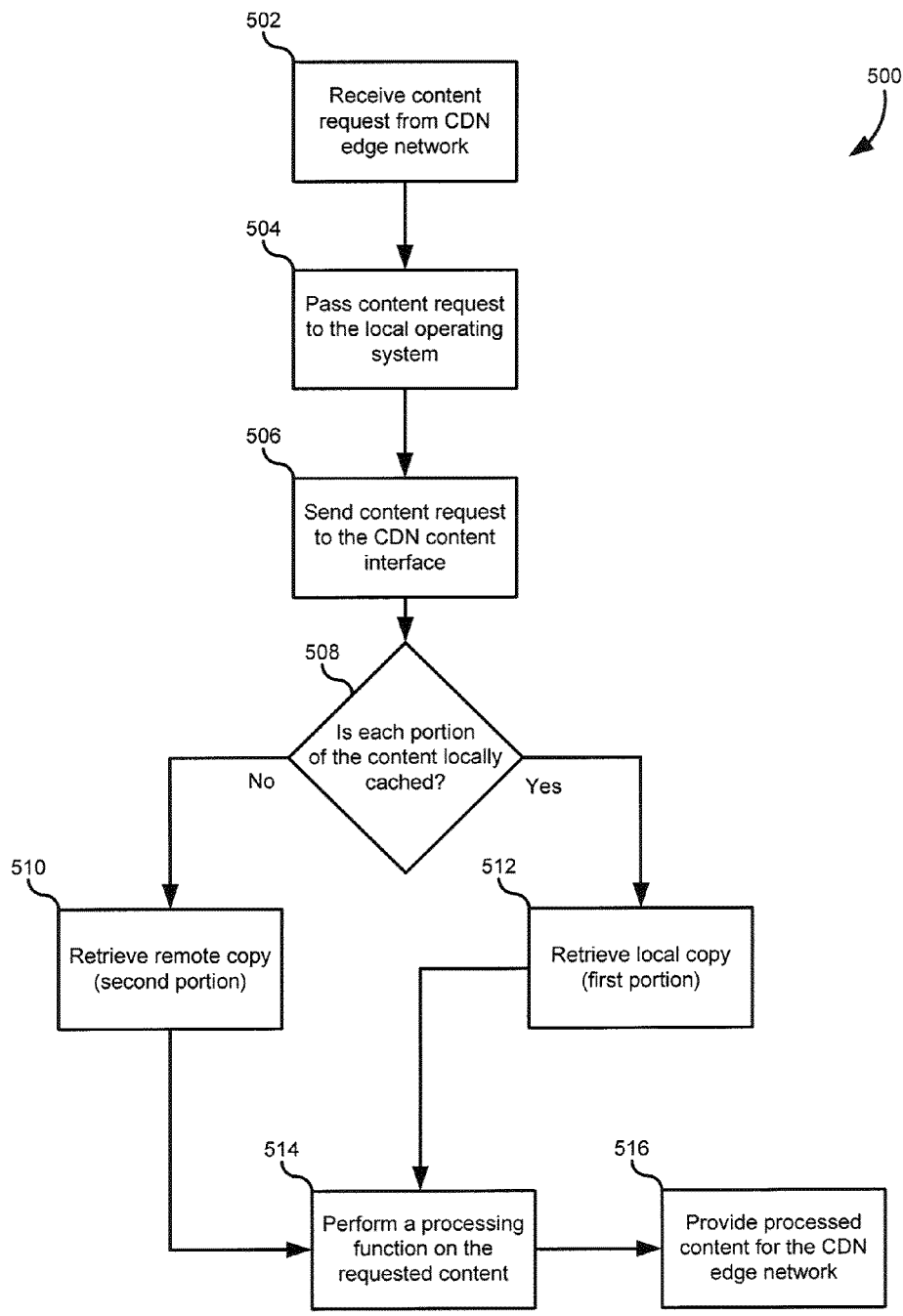
FIG. 5 depicts a flow chart of a method for processing intermediate content in a CDN, according to one embodiment.

FIG. 5 depicts a flow chart 500 of a method of handling content requests received from edge servers by an intermediate server in a CDN and accessing and processing content distributed throughout the CDN, according to one embodiment. The method may include receiving content requests from a CDN edge network (502). The CDN edge network may be comprised of one or more edge servers, from which a request may be received. The request may include a Uniform Resource Identifier (URI) associated with requested content. The URI may include a file name and a resource path. In one arrangement, and edge server in the CDN edge network may send the content requests to an ICPS. The ICPS may receive the content through port that is configured to receive requests from an edge network. The content request may originate from an end-user system or from within the CDN itself.

The method may also include passing the content request to a local kernel (504). In one embodiment, the kernel may operate as part of an operating system on the ICPS. The kernel may be configured to access physical resources on the ICPS. The method may additionally include passing the content request to the CDN content interface (506). The CDN content interface may provide virtualized access to content files that are accessible using URIs through the CDN. In one embodiment, the CDN content interface may comprise a virtual file server operating in user space that does not require modifications to the kernel. The CDN content interface may also comprise a caching engine configured to determine whether a local copy of requested content, or a portion of the requested content, is available. The CDN content interface may also comprise a physical storage device configured to store locally-cached copies of previously requested content objects. The physical storage device may be smaller, or have a smaller storage capacity, than a storage capacity typically associated with edge servers in the CDN or origin servers.

In one embodiment, the content processor may be configured to interface with a local kernel rather than the CDN content interface. Therefore, in this embodiment, the content request may need to go through the kernel to access the CDN content interface.

The method may further include determining whether each portion of the requested content is locally cached (508). This determining step may be optional in some embodiments. "Locally cached" may refer to cached copies of content portions that are available on a local storage device, on a storage device of an edge server within the same POP, or on a storage device of an origin server that is accessible through the POP, depending on the particular embodiment. Content that is not locally cached may be stored on an edge server within a different POP, or on an origin server that is accessible by an edge server within a different POP.

The method may also include retrieving a remote copy (510), and/or retrieving a local copy (512). In one embodiment, the entire requested content may be retrieved as a local copy. In another embodiment, the entire requested content may be retrieved as a remote copy. In another embodiment, a first portion of the requested content may be locally available within the same POP as the ICPS. Similarly, a second portion of content may be remotely accessible through a second POP. In this case, both the first and second portions of the requested content can be retrieved from each respective source. In one embodiment, a third portion of the requested content may also be retrieved from a local storage device that is part of the ICPS. It will be understood that portions of the content may be provided from multiple locations accessible by the CDN, or alternatively, that the entire requested content may be provided from a single location accessible by the CDN.

In some cases, the ICPS may determine that only a portion of the requested content needs to be processed. For example, a file type may be used to determine that only a first portion of the content will be viewed by an end-user system. Similarly, a content type may be used to determine that only a first portion of the content will typically be viewed by an end-user system. In these cases, only a portion of the requested content may need to be provided to the content processor. After receiving all of the portions of the requested content, the CDN content interface can pass the requested content, or a portion thereof, to the content processor through the kernel.

The method may also include a performing a processing function on the requested content (514). In one embodiment, the processing function may comprise dividing the requested content into streaming data chunks. For example, the content processor may be a proprietary module used to provide a chunk streaming service. In another embodiment, the content processor may comprise an FTP server that may provide file upload and download to the CDN using this protocol. In another embodiment, the processing function may comprise encrypting or decrypting requested content. In another embodiment, the processing function may comprise transcoding, or changing a first format of the requested content into a second format. In another embodiment, the processing function may comprise compressing or decompressing the content. In another embodiment, the processing function may comprise packaging various content objects together.

The content processor may comprise a third-party proprietary module. This module may require a license, which may be a per-installation license. In some embodiments, the content processor may be designed to interact with the kernel. The content processor may also be designed to interact with a local concrete file system. The content processor may receive the requested content or a portion of the requested content and generate processed content according to the processing function of the particular embodiment. Finally, the content processor may provide the processed content to be sent to the CDN edge network. The content may be provided to the particular edge server responsible for the original content request.

It should be appreciated that the specific steps illustrated in FIG. 5 provide particular methods of providing for processing and accessing content according to various embodiments of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
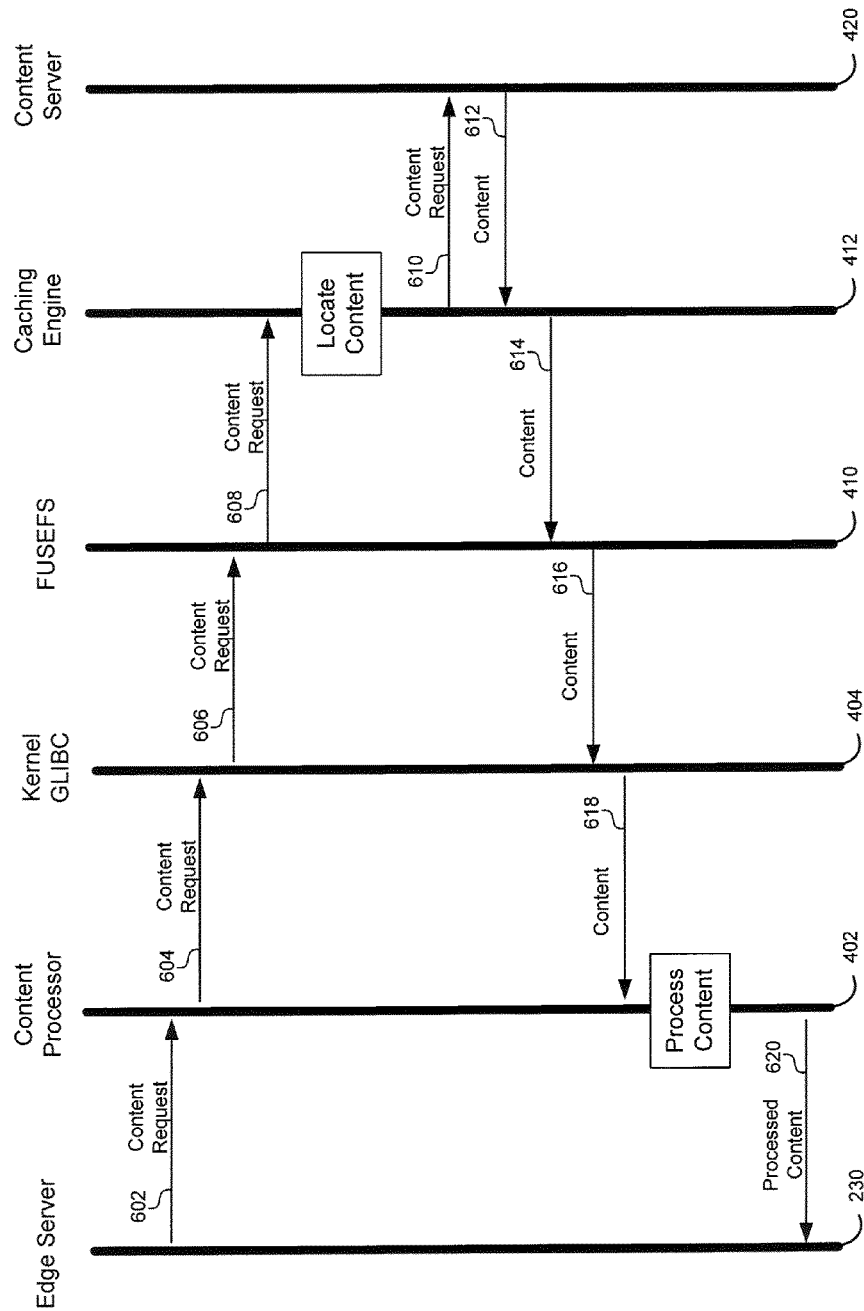
FIG. 6 depicts a swim diagram of transactions within an ICPS, according to one embodiment.

FIG. 6 depicts a swim diagram of transactions within an ICPS, according to one embodiment. The swim diagram is merely exemplary, and is meant to illustrate how content and content requests can flow between the various components of a CDN and an ICPS. Initially, an edge server 230 from the edge network of a CDN may send a content request to an ICPS (602). The content request may be received specifically by a content processor 402 of the ICPS. In another embodiment, a request handling module of the ICPS may route the content to a particular content processor, depending on the type of content processing implicated by the request.

The content processor 402 can send the content request to a local kernel 404 to retrieve what it may consider to be a local file (604). The local kernel 404 can send the content request to a virtual file server 410 (606). The virtual file server 410 may have access to a caching engine 412 that can be used to locate content associated with the content request (608). The caching engine 412 can determine whether any portion of the content is available on a local storage device. If at least a portion of the content is not located on a local storage device, the caching engine 412 may send the URI into the CDN hierarchy to retrieve a location of a content server 420 on which the content is stored. In one embodiment, the content server 420 may comprise the ICPS itself using a local storage device. In another embodiment, the content server 420 may comprise an origin server 112 operated by a content provider. In yet another embodiment, the content server 420 may comprise another edge server 230. In yet another embodiment, the content server 420 may comprise another type of server that is part of a CDN cache hierarchy. The content server 420 may be part of the same POP as the ICPS, or may be part of a different POP.

After the content is located, the content request may be forwarded to the identified content server 420 (610). In response, the content server 420 may send the content, or a portion of the content, to the caching engine 412 (612). The caching engine 412 may determine whether to store a local cached version of the content in a local storage device on the ICPS according to the factors described elsewhere in this disclosure. The caching engine 412 may then pass at least a portion of the content through the virtual file system 410 (614) and/or the local kernel 404 (616) to the content processor 402 (618). The content processor 402 may then process the content in a manner implicated by the content request or by setting specified by the ICPS, the CDN, the CDN cache hierarchy, or the content provider. Finally, at least a portion of the processed content may be delivered to the requesting edge server 23 for delivery to an end-user system (620).

Figure 7:
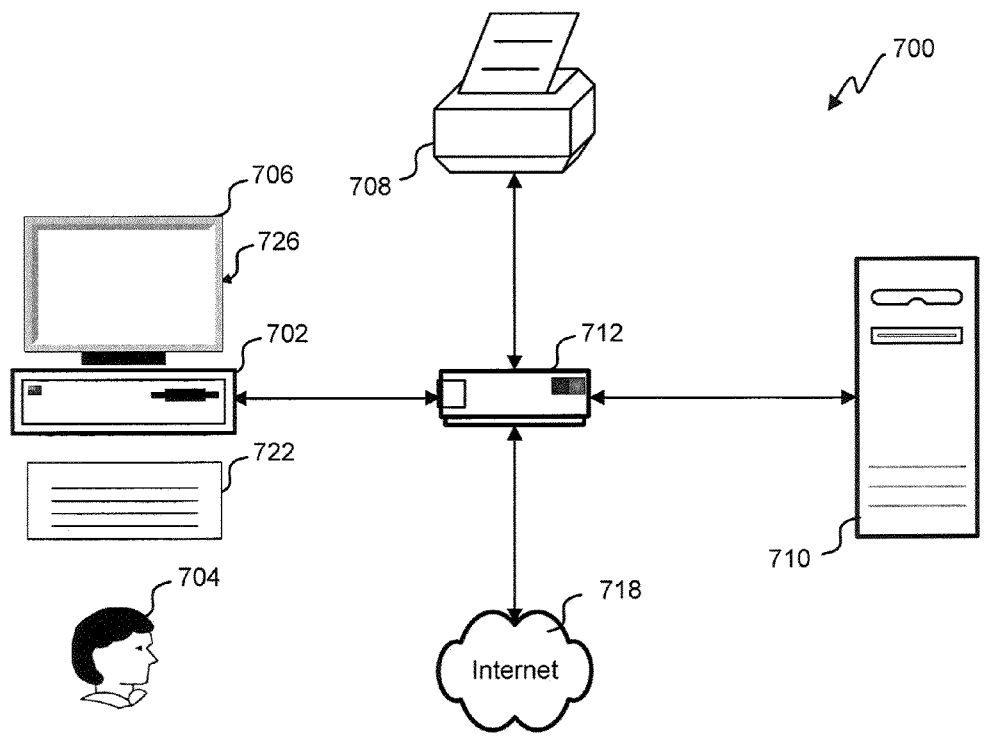
FIG. 7 depicts a block diagram of an embodiment of a computer system.

Referring next to FIG. 7, an exemplary environment with which embodiments may be implemented is shown with a computer system 700 that can be used by a user 704 to program, design or otherwise interact with the computer system 700. The computer system 700 can include a computer 702, keyboard 722, a network router 712, a printer 708, and a monitor 706. The monitor 706, processor 702 and keyboard 722 are part of a computer system 726, which can be a laptop computer, desktop computer, handheld computer, mainframe computer, etc. The monitor 706 can be a CRT, flat screen, etc.

A user 704 can input commands into the computer 702 using various input devices, such as a mouse, keyboard 722, track ball, touch screen, etc. If the computer system 700 comprises a mainframe, a user 704 can access the computer 702 using, for example, a terminal or terminal interface. Additionally, the computer system 726 may be connected to a printer 708 and a server 710 using a network router 712, which may connect to the Internet 718 or a WAN.

The server 710 may, for example, be used to store additional software programs and data. In one embodiment, software implementing the systems and methods described herein can be stored on a storage medium in the server 710. Thus, the software can be run from the storage medium in the server 710. In another embodiment, software implementing the systems and methods described herein can be stored on a storage medium in the computer 702. Thus, the software can be run from the storage medium in the computer system 726. Therefore, in this embodiment, the software can be used whether or not computer 702 is connected to network router 712. Printer 708 may be connected directly to computer 702, in which case, the computer system 726 can print whether or not it is connected to network router 712.

Figure 8:
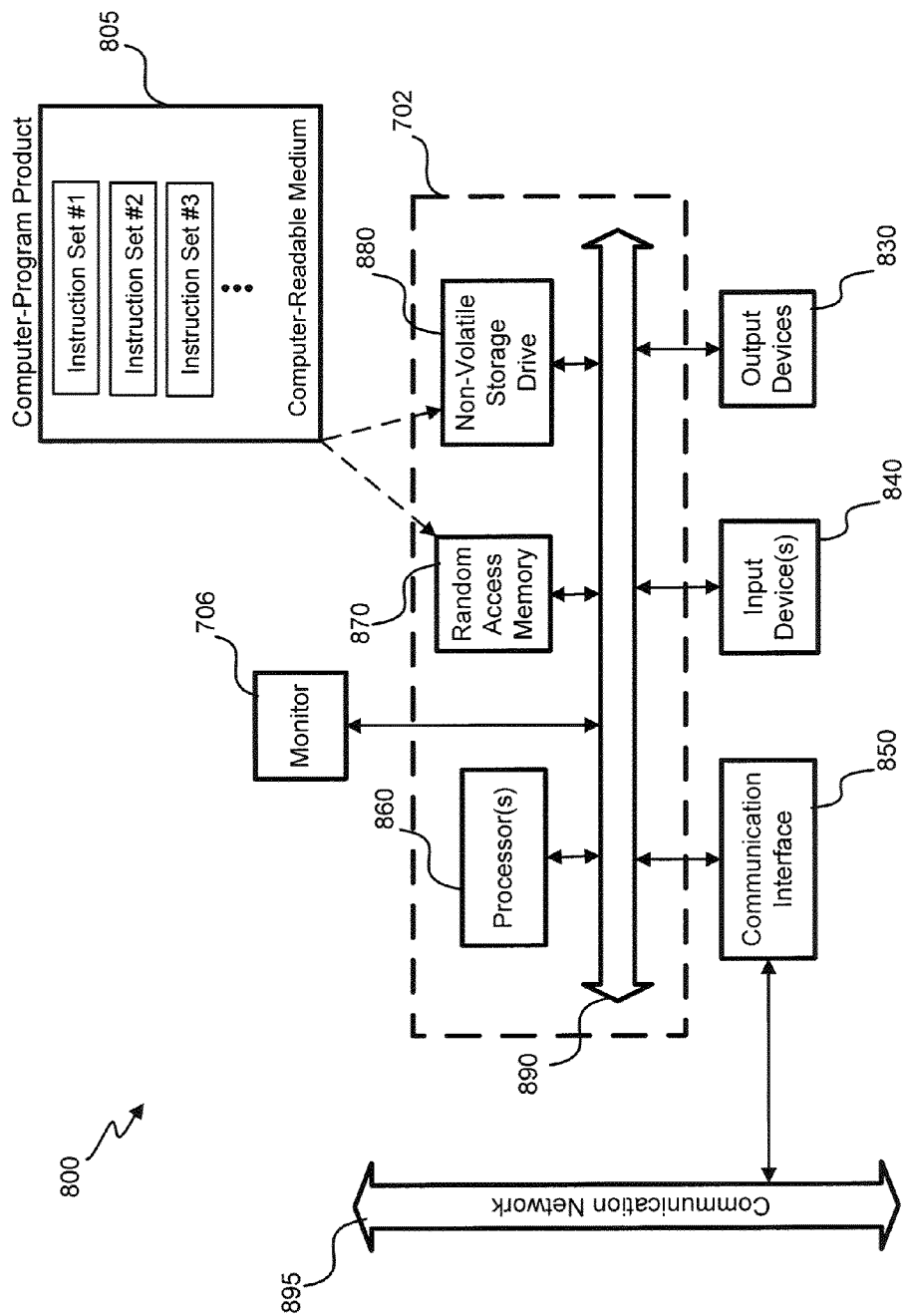
FIG. 8 depicts a block diagram of an embodiment of a special-purpose computer system.

With reference to FIG. 8, an embodiment of a special-purpose computer system 800 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 826, it is transformed into the special-purpose computer system 800.

Special-purpose computer system 800 comprises a computer 702, a monitor 706 coupled to computer 702, one or more additional user output devices 830 (optional) coupled to computer 702, one or more user input devices 840 (e.g., keyboard, mouse, track ball, touch screen) coupled to computer 702, an optional communications interface 850 coupled to computer 702, a computer-program product 805 stored in a tangible computer-readable memory in computer 702. Computer-program product 805 directs system 800 to perform the above-described methods. Computer 702 may include one or more processors 860 that communicate with a number of peripheral devices via a bus subsystem 890. These peripheral devices may include user output device(s) 830, user input device(s) 840, communications interface 850, and a storage subsystem, such as random access memory (RAM) 870 and non-volatile storage drive 880 (e.g., disk drive, optical drive, solid state drive), which are forms of tangible computer-readable memory.

Computer-program product 805 may be stored in non-volatile storage drive 880 or another computer-readable medium accessible to computer 702 and loaded into memory 870. Each processor 860 may comprise a microprocessor, such as a microprocessor from Intel® or Advanced Micro Devices, Inc.®, or the like. To support computer-program product 805, the computer 702 runs an operating system that handles the communications of product 805 with the above-noted components, as well as the communications between the above-noted components in support of the computer-program product 805. Exemplary operating systems include Windows® or the like from Microsoft® Corporation, Solaris® from Oracle®, LINUX, UNIX, and the like.

User input devices 840 include all possible types of devices and mechanisms to input information to computer system 702. These may include a keyboard, a keypad, a mouse, a scanner, a digital drawing pad, a touch screen incorporated into the display, audio input devices such as voice recognition systems, microphones, and other types of input devices. In various embodiments, user input devices 840 are typically embodied as a computer mouse, a trackball, a track pad, a joystick, wireless remote, a drawing tablet, a voice command system. User input devices 840 typically allow a user to select objects, icons, text and the like that appear on the monitor 806 via a command such as a click of a button or the like. User output devices 830 include all possible types of devices and mechanisms to output information from computer 702. These may include a display (e.g., monitor 806), printers, non-visual displays such as audio output devices, etc.

Communications interface 850 provides an interface to other communication networks and devices and may serve as an interface to receive data from and transmit data to other systems, WANs and/or the Internet 818. Embodiments of communications interface 850 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 850 may be coupled to a computer network, to a FireWire® bus, or the like. In other embodiments, communications interface 850 may be physically integrated on the motherboard of computer 702, and/or may be a software program, or the like.

RAM 870 and non-volatile storage drive 880 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 870 and non-volatile storage drive 880 may be configured to store the basic programming and data constructs that provide the functionality of various embodiments of the present invention, as described above.

Software instruction sets that provide the functionality of the present invention may be stored in RAM 870 and non-volatile storage drive 880. These instruction sets or code may be executed by the processor(s) 860. RAM 870 and non-volatile storage drive 880 may also provide a repository to store data and data structures used in accordance with the present invention. RAM 870 and non-volatile storage drive 880 may include a number of memories including a main random access memory (RAM) to store of instructions and data during program execution and a read-only memory (ROM) in which fixed instructions are stored. RAM 870 and non-volatile storage drive 880 may include a file storage subsystem providing persistent (non-volatile) storage of program and/or data files. RAM 870 and non-volatile storage drive 880 may also include removable storage systems, such as removable flash memory.

Bus subsystem 890 provides a mechanism to allow the various components and subsystems of computer 702 communicate with each other as intended. Although bus subsystem 890 is shown schematically as a single bus, alternative embodiments of the bus subsystem may utilize multiple busses or communication paths within the computer 702.

A number of variations and modifications of the disclosed embodiments can also be used. For example, embodiments show the DNS function being resident within a POP with edge servers, but other embodiments could place the DNS function geographically separate from any content serving functions. Other embodiments could place multiple DNS functions in a POP to divide the work load for those DNS requests received by the POP.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. An edge server for handling content requests in a Content Delivery Network (CDN), the edge server comprising:
   one or more processors; and
   a non-transitory memory comprising instructions which, when executed by the one or more processors, cause the one or more processors to perform operations including:
      receiving a content request sent to the CDN, wherein:
         the edge server is part of a first Point-of-Presence (POP) in the CDN; and
         the content request is received by a process running on the edge server that is configured to interact with a local file system having a single logical address space;
      passing the content request from the process to an operating system running in kernel space on the edge server to make a file request for the content from a local file system;
      passing the file request from the operating system to a file system interface on the edge server that provides unified access to:
         a first file system operating in kernel space that provides access to files stored on the edge server; and
         a second file system operating in user space, that provides virtualized access to content in multiple POPs throughout the CDN, wherein:
            the file system interface makes the combined contents of the first file system and the second file system appear to be a single logical space to the operating system;

determining, by the file system interface, that the content is not stored in the first file system;
passing the file request through the second file system to a caching engine on the edge server;
receiving the content from a second POP through the second file system and the caching engine such that the content appears to be a locally stored file to the operating system; and
providing the content through the process.

2. The edge server of claim 1, wherein the instructions cause the one or more processors to perform further operations comprising:
receiving a request for second content;
making a local request for the second content, by the operating system, to the file system interface, wherein:
a first portion of the second content is stored locally on the edge server;
a second portion of the second content is stored remotely in the second POP; and
the file system interface generates the second content by combining at least the first portion of the second content from the first file system and the second portion of the second content from the second file system; and
providing the second content to the operating system of the edge server through the file system interface, wherein the file system interface makes the second content comprising the first portion of the second content and the second portion of the second content appear to be a single locally stored file to the operating system of the edge server.

3. The edge server of claim 1, wherein the second file system operates in userspace without requiring modifications to a kernel of the operating system.

4. The edge server of claim 1, wherein the content is retrieved from an origin server that is accessible through the second POP.

5. The edge server of claim 1, further comprising:
a physical storage device; and
a caching engine that communicates with the physical storage device and other devices in the CDN.

6. The edge server of claim 1, wherein the instructions cause the one or more processors to perform further operations comprising:
performing a processing function on the content after the content is received from the file system interface to generate processed content.

7. The edge server of claim 6, wherein the processing function comprises dividing the requested content into streaming data chunks.

8. The edge server of claim 6, wherein the processing function comprises transcoding the requested content from a first file format to a second file format.

9. The edge server of claim 6, wherein the process on the edge server comprises a third-party module requiring a per-installation license.

10. The edge server of claim 6, wherein the processing function comprises encrypting or decrypting the requested content.

11. A method for handling content requests received in a Content Delivery Network (CDN) using an edge server, the method comprising:
receiving, at an edge server, a content request sent to the CDN, wherein:
the edge server is part of a first Point-of-Presence (POP) in the CDN; and
the content request is received by a process running on the edge server that is configured to interact with a local file system having a single logical address space;
passing the content request from the process to an operating system running on the edge server in kernel space to make a file request for the content from a local file system;
passing the file request from the operating system to a file system interface on the edge server that provides unified access to:
a first file system operating in kernel space that provides access to files stored on the edge server; and
a second file system operating in user space, that provides virtualized access to content in multiple POPs throughout the CDN, wherein:
the file system interface makes the combined contents of the first file system and the second file system appear to be a single logical space to the operating system;
determining, by the file system interface, that the content is not stored in the first file system;
passing the file request through the second file system to a caching engine on the edge server;
receiving the content from a second POP through the second file system and the caching engine such that the content appears to be a locally stored file to the operating system; and
providing the content through the process.

12. The method of claim 11, further comprising:
receiving, at the edge server, a request for second content;
making, by the operating system of the edge server, a local request for the second content to the file system interface, wherein:
a first portion of the second content is stored locally on the edge server;
a second portion of the second content is stored remotely in the second POP; and
the file system interface generates the second content by combining at least the first portion of the second content from the first file system and the second portion of the second content from the second file system; and
providing the second content to the operating system of the edge server through the file system interface, wherein the file system interface makes the second content comprising the first portion of the second content and the second portion of the second content appear to be a single locally stored file to the operating system of the edge server.

13. The method of claim 11, wherein the file system interface operates in userspace without requiring modifications to a kernel of the operating system.

14. The method of claim 11, wherein the content is retrieved from an origin server that is accessible through the second POP.

15. The method of claim 11, wherein the edge server comprises:
a physical storage device; and
a caching engine that communicates with the physical storage device and other devices in the CDN.

16. The method of claim 11, further comprising:
performing, by the process on the edge server, a processing function on the content after the content is received from the file system interface to generate processed content.

17. The method of claim 16, wherein the processing function comprises dividing the requested content into streaming data chunks.

18. The method of claim 16, wherein the processing function comprises transcoding the requested content from a first file format to a second file format.

19. The method of claim 16, wherein the processor process on the edge server comprises a third-party module requiring a per-installation license.

20. The method of claim 16, wherein the processing function comprises encrypting or decrypting the requested content.

* * * * *